United States Patent
Ilda et al.

(10) Patent No.: US 7,909,356 B2
(45) Date of Patent: Mar. 22, 2011

(54) AIRBAG APPARATUS

(75) Inventors: Takashi Ilda, Aichi-ken (JP); Makoto Yamanaka, Aichi-ken (JP); Yasuo Ochiai, Aichi-ken (JP); Yoshio Mizuno, Aichi-ken (JP)

(73) Assignee: Toyoda Gosei Co., Ltd., Aichi-Pref. (JP)

( * ) Notice: Subject to any disclaimer, the term of this patent is extended or adjusted under 35 U.S.C. 154(b) by 224 days.

(21) Appl. No.: 12/232,909

(22) Filed: Sep. 25, 2008

(65) Prior Publication Data
US 2009/0085330 A1    Apr. 2, 2009

(30) Foreign Application Priority Data

Sep. 27, 2007 (JP) .................................. 2007-251096
Jan. 18, 2008 (JP) .................................. 2008-009612
May 14, 2008 (JP) .................................. 2008-127415

(51) Int. Cl.
  B60R 21/213   (2006.01)
  B60R 21/231   (2006.01)
(52) U.S. Cl. ................. 280/730.1; 280/728.2; 280/730.2
(58) Field of Classification Search ............... 280/728.2, 280/730.1, 730.2
See application file for complete search history.

(56) References Cited

U.S. PATENT DOCUMENTS

| | | | | |
|---|---|---|---|---|
| 6,293,581 B1 * | 9/2001 | Saita et al. | ................. | 280/730.2 |
| 6,695,342 B2 * | 2/2004 | Tanase et al. | ............... | 280/730.2 |
| 6,705,636 B2 * | 3/2004 | Takahara | ................... | 280/728.2 |
| 6,722,693 B2 * | 4/2004 | Ikeda et al. | ................ | 280/730.2 |
| 6,808,203 B2 * | 10/2004 | Takahara | ...................... | 280/740 |
| 6,811,184 B2 * | 11/2004 | Ikeda et al. | ................... | 280/742 |
| 6,860,506 B2 * | 3/2005 | Ogata et al. | ................ | 280/730.2 |
| 6,866,293 B2 * | 3/2005 | Ogata | ........................ | 280/730.2 |
| 7,077,425 B2 * | 7/2006 | Ogawa et al. | ............. | 280/730.2 |
| 7,237,798 B2 * | 7/2007 | Mori et al. | ................. | 280/730.1 |
| 7,273,228 B2 * | 9/2007 | Noguchi et al. | .......... | 280/730.2 |
| 7,290,798 B2 * | 11/2007 | Mori et al. | ................. | 280/743.1 |

(Continued)

OTHER PUBLICATIONS

The Extended European Search Report dated Mar. 3, 2010 issued from the European Patent Office in the corresponding European patent application No. 08017021.0.

(Continued)

*Primary Examiner* — Paul N Dickson
*Assistant Examiner* — Laura Freedman
(74) *Attorney, Agent, or Firm* — Posz Law Group, PLC

(57) ABSTRACT

An airbag apparatus includes an airbag that has a first portion and a second portion. The airbag is folded such that the first portion approaches the second portion. The folded airbag has an elongated shape extending along a first direction. An inlet 12a is formed in the airbag 5. By receiving the supply of gas through the inlet 12a, the folded airbag 5 is inflated while being deployed in a second direction perpendicular to the first direction, such that the first portion moves away from the second portion. The inlet 12a is arranged in a part of the folded airbag 5 that is located in a trailing side in the second direction. A first attachment portion 16 is provided in the same part of the folded airbag 5. A second attachment portion 27 is provided in each of the ends of the folded airbag 5. The folded airbag 5 is installed in a ceiling of a vehicle 2 by means of the first attachment portion 16 and the second attachment portions 27. When the airbag 5 is being deployed and inflated, the second attachment portions 27 function to apply an outward tension along the first direction to the airbag 5.

6 Claims, 10 Drawing Sheets

U.S. PATENT DOCUMENTS

| | | | |
|---|---|---|---|
| 7,314,233 B2 * | 1/2008 | Kino et al. | 280/730.2 |
| 7,331,602 B2 * | 2/2008 | Ochiai et al. | 280/730.2 |
| 7,347,446 B2 * | 3/2008 | Inoue et al. | 280/730.2 |
| 7,364,185 B2 | 4/2008 | Mori et al. | |
| 7,434,831 B2 | 10/2008 | Noguchi et al. | |
| 7,597,348 B2 * | 10/2009 | Fukuda et al. | 280/730.2 |
| 7,621,558 B2 * | 11/2009 | Mori et al. | 280/730.1 |
| 7,648,160 B2 * | 1/2010 | Mori et al. | 280/730.1 |
| 2003/0230878 A1 | 12/2003 | Inoue | |
| 2004/0239084 A1 | 12/2004 | Mori et al. | |
| 2008/0143084 A1 * | 6/2008 | Mizuno et al. | 280/730.1 |
| 2008/0150263 A1 * | 6/2008 | Mizuno et al. | 280/730.1 |
| 2008/0238052 A1 * | 10/2008 | Iida et al. | 280/730.1 |
| 2009/0236832 A1 * | 9/2009 | Ilda et al. | 280/730.1 |

OTHER PUBLICATIONS

Notification of the First Office Action dated Apr. 7, 2010 issued from the Chinese Patent Office in the corresponding Chinese patent application No. 200810148838.X (with English translation).

* cited by examiner

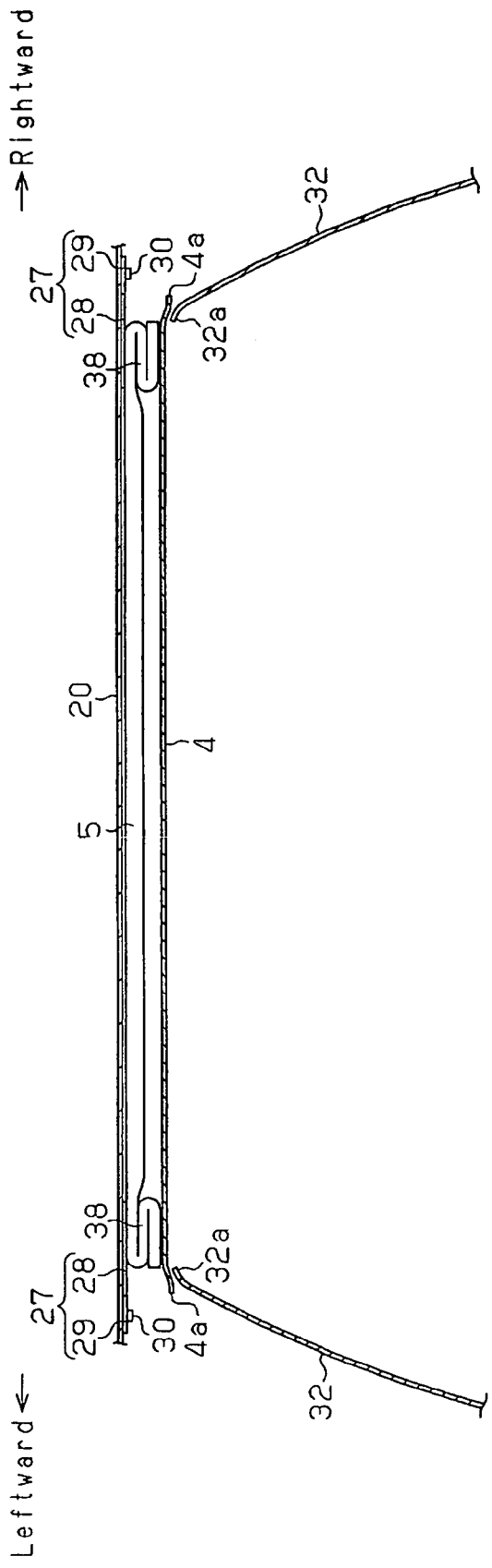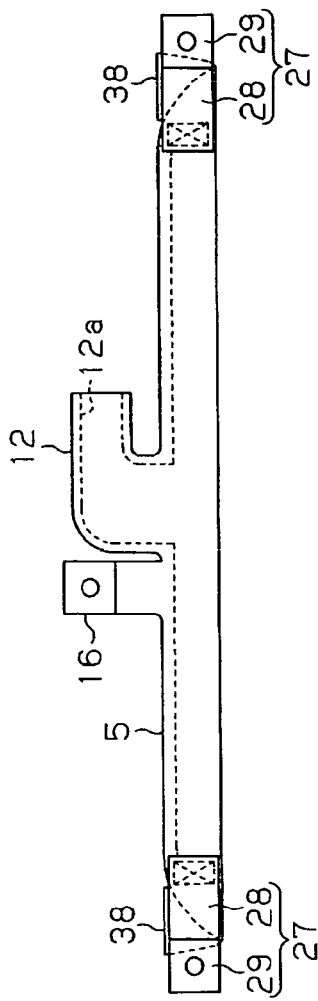

AIRBAG APPARATUS

BACKGROUND OF THE INVENTION

The present invention relates to an airbag apparatus.

Airbag apparatuses provided with an airbag having the following configuration have been known. The airbag has a first portion and a second portion, and is folded such that the first portion approaches the second portion. The thus folded airbag has an elongated shape. The airbag has an inlet. When supplied with gas through the inlet, the folded airbag is inflated while being deployed along a predetermined deployment direction, such that the first portion separates from the second portion. The inlet is arranged in a portion of the folded airbag that is located in a trailing side in the deployment direction.

For example, Japanese Laid-Open Patent Publication No. 2004-058849 discloses in paragraphs 0010, 0021 through 0023, and 0029, and FIGS. 3 through 5 a configuration in which a folded airbag having an elongated shape is accommodated between a roof panel and a roof headlining so as to extend in the width of a vehicle. More specifically, the folded airbag is accommodated in a space between rearmost sections of the roof panel and the roof headlining. The roof panel and the roof headlining are bent downward at the rear end of the vehicle, such that the rearmost sections of the roof panel and the roof headlining are substantially parallel to a vertical plane. Attachment portions are provided at an upper portion of the folded airbag. The attachment portions are used to attach the airbag to an inner panel. The inner panel is arranged between the roof panel and the roof headlining and is bent accordingly. In the airbag apparatus disclosed in Japanese Laid-Open Patent Publication No. 2004-058849, gas is supplied from above to the folded airbag, which inflates the airbag while deploying the airbag downward. When deployed and inflated, the airbag intervenes between the rear seats and the rear window.

When the airbag is supplied with gas so that it is deployed and inflated, the momentum of the supplied gas applies a downward urging force, or a force in the deployment direction, to the airbag. However, the airbag is prevented from being displaced downward by the urging force since the airbag is attached to the inner panel at the attachment portions. Further, a tension applying portion extends downward from each end of the folded airbag. The tension applying portions apply outward tension along the width of the vehicle to the airbag. This allows the airbag to be deployed and inflated in a favorable manner from the folded state.

In recent years, to meet the demands for larger spaces of passenger compartments, it has become difficult to secure a space for accommodating a folded airbag in a vehicle rear portion. Therefore, it has become necessary to accommodate a folded airbag in a part closer to the front side of the vehicle, in other words, between sections of the roof panel and the roof headlining that are substantially parallel to the horizontal plane, or in the ceiling of the vehicle. In such a case, an airbag is attached to the inner panel from below. When supplied with gas, an airbag accommodated in the ceiling of a vehicle is inflated while being deployed rearward and downward in the vehicle, so as to intervene between the rear seats and the rear window.

However, in the case where an airbag is accommodated in the ceiling of a vehicle, the desirable deployment and inflation of the airbag are likely to be hindered for the following reasons [1] and [2].

[1] Since the folded airbag is attached to the inner panel from below, the ends of the folded airbag might hang down because of the tension applying portions. When gas is supplied to the airbag in this state, the airbag is inflated while being deployed along an unexpected path.

[2] In the initial stage of the deployment and inflation of the airbag, the airbag receives an urging force due to its own inflation, which urging force acts to pivot the airbag about the attachment portions in a certain direction (for example, forward). If the airbag is pivoted by the urging force, the airbag is inflated while being deployed along an unexpected path.

The above problem that desirable deployment and inflation of an airbag accommodated in the ceiling of a vehicle might be hindered is not unique to airbag apparatuses in which an airbag accommodated in the vehicle ceiling is inflated while being deployed rearward and downward in the vehicle. However, the problem is also found in airbag apparatuses in which an airbag accommodated in the vehicle ceiling is inflated while being deployed outward along the direction of the width of the vehicle.

SUMMARY OF THE INVENTION

Accordingly, it is an objective of the present invention to provide an airbag apparatus that allows an airbag accommodated in the ceiling of a vehicle to be deployed and inflated in a favorable manner.

To achieve the foregoing objective and in accordance with one aspect of the present invention, an airbag apparatus including an airbag is provided. The airbag has a first portion and a second portion. A folded airbag is formed by folding the airbag such that the first portion approaches the second portion. The folded airbag has an elongated shape extending along a first direction. The airbag has an inlet. When receiving supply of gas through the inlet, the folded airbag is inflated while being deployed in a second direction perpendicular to the first direction, such that the first portion moves away from the second portion. In the folded airbag, the inlet is arranged in a trailing position in the second direction, and a first attachment portion is provided in the same position of the folded airbag. A second attachment portion is provided in each of the ends of the folded airbag. The folded airbag is installed in a ceiling of a vehicle from below by means of the first attachment portion and the second attachment portions. When the airbag is being deployed and inflated, the second attachment portions function to apply an outward tension along the first direction to the airbag.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5A is a cross-sectional front view for explaining a state in which a folded airbag of the airbag apparatus shown in FIG. 1 is accommodated in a vehicle ceiling;

FIG. 5B is a plan view illustrating the folded airbag shown in FIG. 5A;

DETAILED DESCRIPTION OF THE PREFERRED EMBODIMENTS

One embodiment of the present invention will now be described with reference to FIGS. 1 to 6.

Figure 1:
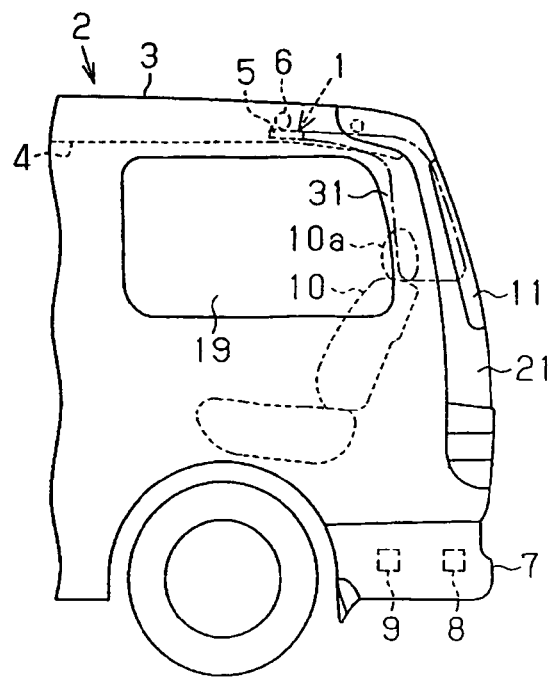
FIG. 1 is a side view illustrating a rear portion of a vehicle in which an airbag apparatus according to one embodiment of the present invention is installed.
Figure 2:
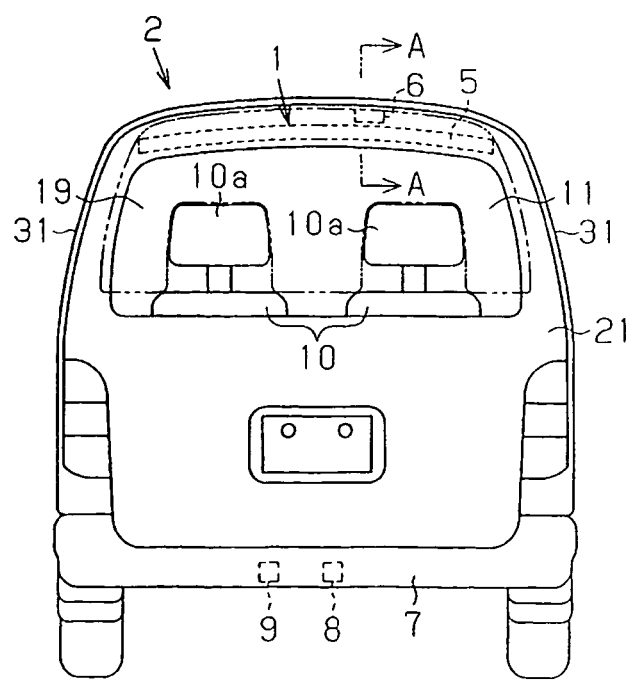
FIG. 2 is a rear view of the vehicle shown in FIG. 1.

As shown in FIGS. 1 and 2, an airbag apparatus 1 according to the present embodiment has an airbag 5, which is folded and accommodated in a space in a rear portion of an automobile 2. Specifically, the airbag 5 is accommodated between a roof panel 3 and a roof headlining 4 located below the roof panel 3, or in the ceiling of the automobile 2. The airbag 5 and the roof headlining 4 are located above a pair of rear pillars 31, which extend vertically in a rear portion of the automobile 2. An inflator 6 for supplying gas to the airbag 5 is located between the roof panel 3 and the roof headlining 4, at a position in front of the airbag 5.

In a rear portion of the automobile 2, for example, in a rear bumper 7, a sensor 8 is provided that outputs a signal when an impact greater than or equal to a predetermined value is applied to the rear of the automobile 2. Signals from the sensor 8 are sent to a controller 9. When receiving a signal from the sensor 8, the controller 9 outputs an actuation signal to the inflator 6. When receiving an actuation signal from the controller 9, the inflator 6 supplies gas to the airbag 5. When receiving the gas in this manner, the folded airbag 5 accommodated in the ceiling of the automobile 2 is inflated while being deployed rearward in the automobile 2, more specifically, toward a space behind rear seats 10. After being deployed and inflated, the airbag 5 is located between the rear seats 10 and a rear window 11 as shown by two dot chain lines in FIGS. 1 and 2.

The space between the rear pillars 31 increases toward its bottom. Accordingly, the space in the rear portion of the passenger compartment 19 increases in size along the width of the automobile 2 toward its bottom. To conform to the shape of the space in the rear portion of the passenger compartment 19, the deployed and inflated airbag 5 has a size that increases from the upper end toward the lower end with respect to a direction along the width of the automobile 2.

The airbag 5 will now be described with reference to FIG. 3.

The airbag 5 is formed by sewing a pair of fabric sheets and has a connection portion 12, a lateral inflatable cell 13, and left and right vertical inflatable cells 14, and a pair of center vertical inflatable cells 15. The connection portion 12 extends upward from the center of the lateral inflatable cell 13 as viewed in FIG. 3. The connection portion 12 has an inlet 12a and is connected to the inflator 6. Each of the left and right vertical inflatable cells 14 extends downward from one of the ends of the lateral inflatable cell 13 as viewed in FIG. 3. The center vertical inflatable cells 15 extend downward from the center of the lateral inflatable cell 13 as viewed in FIG. 3. The lateral inflatable cell 13 communicates with each of the connection portion 12 and the vertical inflatable cells 14, 15. A section 17 of the airbag 5 that is located below the lateral inflatable cell 13 and between the left vertical inflatable cell 14 and the center vertical inflatable cells 15, and a section 17 of the airbag 5 that is located below the lateral inflatable cell 13 and between the right vertical inflatable cell 14 and the center vertical inflatable cells 15 are portions of one of the two fabric sheets and cannot be inflated.

When the airbag 5 is deployed and inflated, the lateral inflatable cell 13 extends laterally, more specifically, along the width direction of the automobile 2. The left and right vertical inflatable cells 14 each extend rearward and downward from one of the ends of the lateral inflatable cell 13 in the automobile 2, and are located outward of the headrest 10a of the corresponding rear seat 10 with respect to the width direction of the automobile 2. The center vertical inflatable cells 15 extend rearward and downward in the automobile 2 from the center of the lateral inflatable cell 13 and are located between the headrests 10a. The non-inflatable sections 17 are each located behind the corresponding headrest 10a to intervene between the headrest 10a and the rear window 11.

An inner tube 18 is provided inside the connection portion 12 and the lateral inflatable cell 13 of the airbag 5. The inner tube 18 conducts gas from the inflator 6 along predetermined directions in the airbag 5. The inner tube 18 can be folded together with the airbag 5. The folded inner tube 18 can be unfolded together with the folded airbag 5.

A section of the inner tube 18 that is located in the connection portion 12 has an opening corresponding to the inlet 12a. A section of the inner tube 18 that is located in the lateral inflatable cell 13 extends along the direction in which the lateral inflatable cell 13 extends. An opening 18a is formed at each end of the section of the inner tube 18 located in the lateral inflatable cell 13. The openings 18a each correspond to one of the left and right vertical inflatable cells 14. Openings 18b are formed at a center portion of the section of the inner tube 18 located in the lateral inflatable cell 13. The openings 18b each correspond to one of the center vertical inflatable cells 15. Gas supplied from the inflator 6 to the airbag 5 through the inlet 12a passes through the inner tube 18 and flows into the left and right vertical inflatable cells 14 via the left and right openings 18a, and flows into the center vertical inflatable cells 15 via the center openings 18b.

Figure 3:
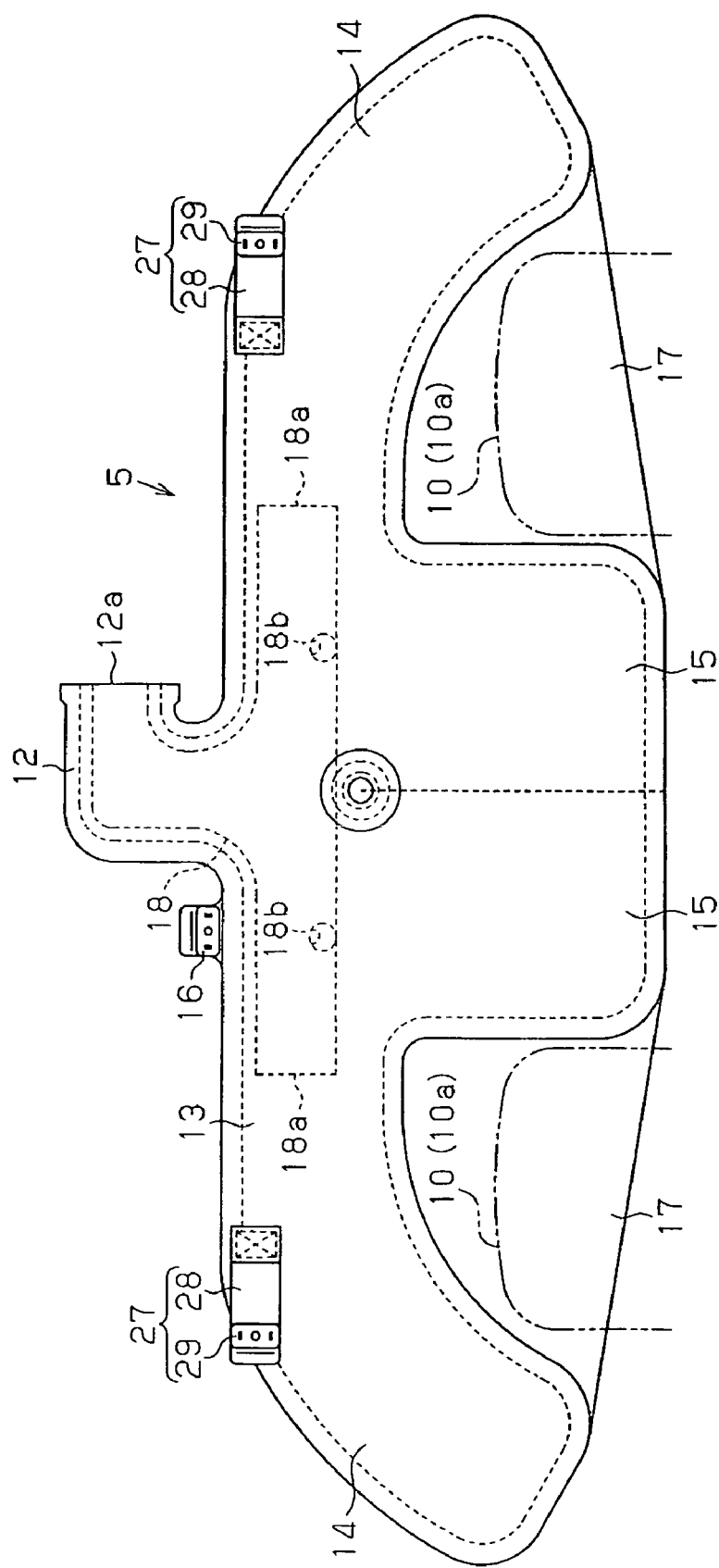
FIG. 3 is a front view showing an unfolded airbag of the airbag apparatus shown in FIG. 1.

When accommodating the airbag 5 between the roof panel 3 and the roof headlining 4, the airbag 5 is folded to cause a first portion (a lower portion as viewed in FIG. 3) to approach a second portion (an upper portion as viewed in FIG. 3). As a result, when folded, the airbag 5 has an elongated shape extending along a first direction. By receiving the supply of gas through the inlet 12a, the folded airbag 5 is inflated while being deployed in a second direction perpendicular to the first direction, such that the first portion moves away from the second portion. The inlet 12a is arranged in a part of the folded airbag 5 that is located in a trailing side in the second direction.

Next, a structure for installing the airbag 5 in the ceiling of the automobile 2 will be described.

As shown in FIG. 3, a first attachment portion 16 is provided at the second portion of the airbag 5, more specifically, substantially at a center portion of the upper edge of the lateral inflatable cell 13. A second attachment portion 27 is provided at the upper edge of each end of the lateral inflatable cell 13. The second attachment portions 27 allow the folded airbag 5 to be attached to the ceiling while outward tension along the first direction is applied to the folded airbag 5. Each second attachment portion 27 has a fixation portion 29 fixed to the ceiling of the automobile 2, and a coupling portion 28. The coupling portion 28 has a distal end (a first end) to which the fixation portion 29 is attached and a proximal end (a second end) attached to the airbag 5. The fixation portion 29 is made of metal and has a rectangular plate-like shape. The coupling portion 28 is made of fabric including warp and weft. The warp and weft may extend, for example, in the lateral and vertical directions as viewed in FIG. 3, respectively. Alternatively, to improve the elasticity of the coupling portion 28, the coupling portion 28 may be formed of bias woven fabric. In this case, the warp and weft may extend in a direction rotated 45° clockwise from the lateral direction in FIG. 3 and in a direction rotated 45° clockwise from the vertical direction in FIG. 3, respectively.

The manner in which the airbag 5 is accommodated between the roof panel 3 and the roof headlining 4 will now be described with reference to FIGS. 4 and 5.

Figure 4:
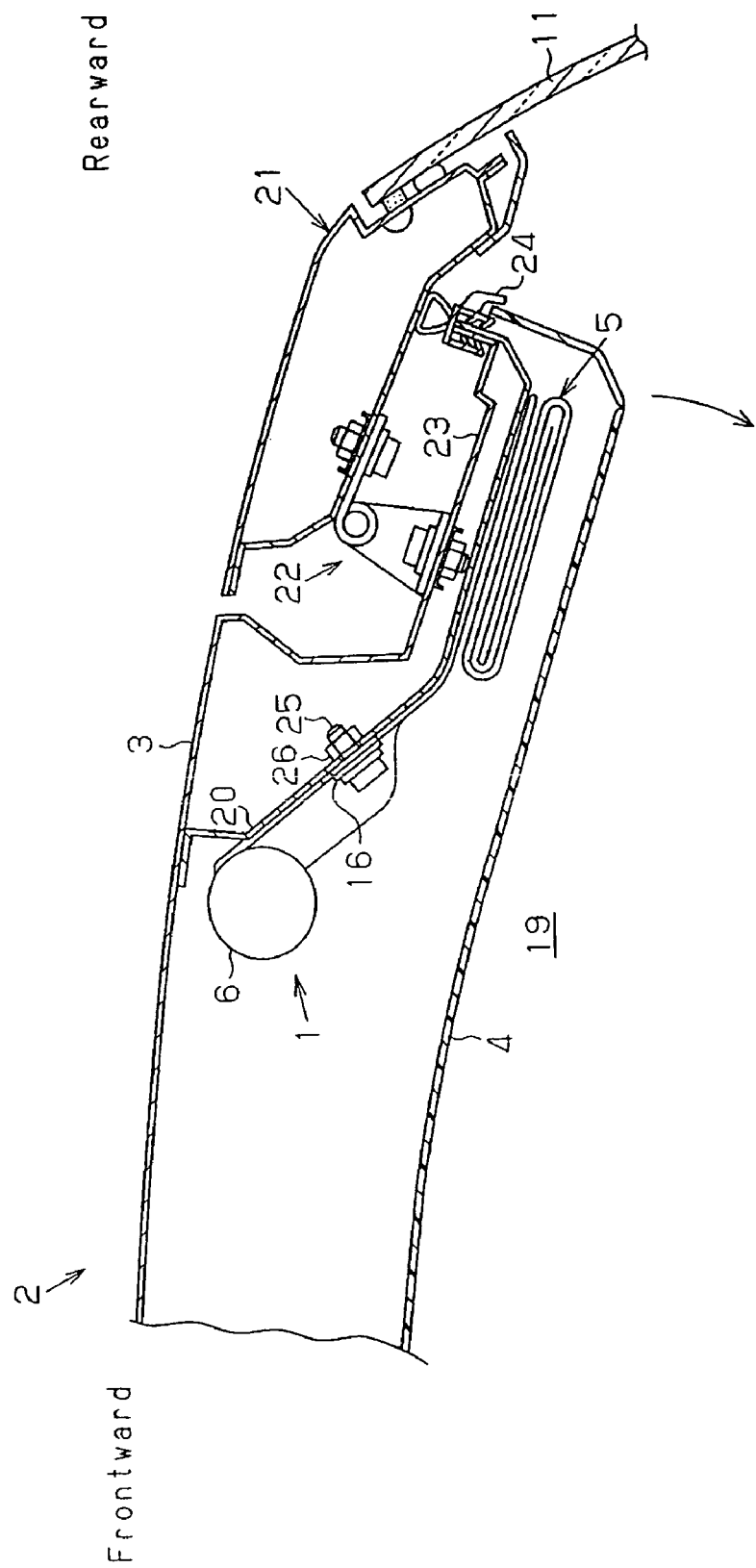
FIG. 4 is a cross-sectional view taken along line A-A of FIG. 2.
Figure 6:
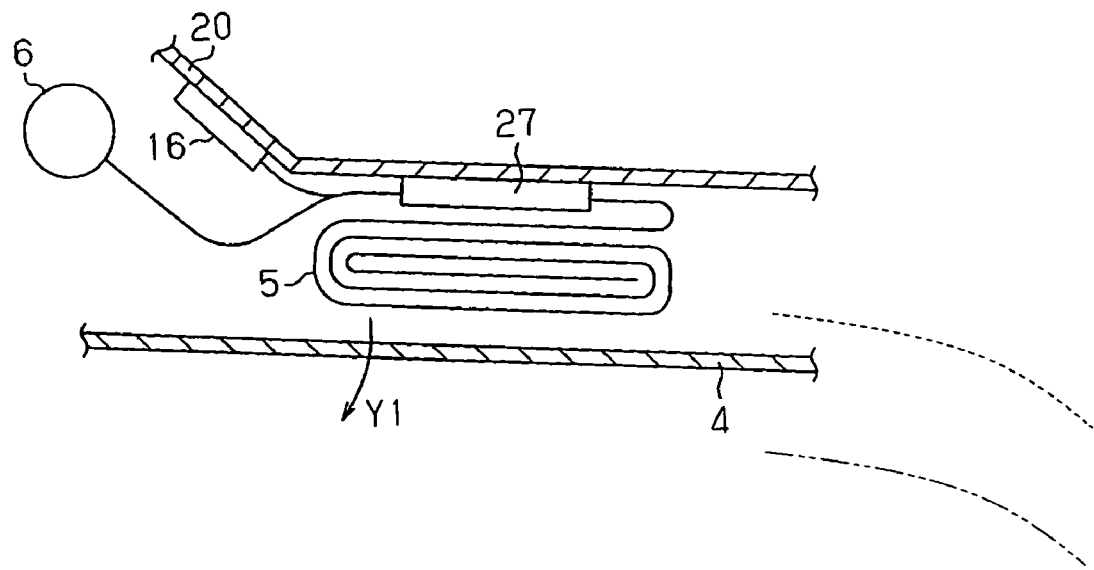
FIG. 6 is a diagram for explaining the process in which the folded airbag of the airbag apparatus shown in FIG. 1 is deployed and inflated.

As shown in FIG. 4, the entire surface of the roof panel 3 that faces the passenger compartment 19 is covered by the roof headlining 4, which is made of a flexible material. The roof panel 3 and the roof headlining 4 are generally horizontal, though they-are slightly inclined downward at a rear portion of the automobile 2. An inner panel 20, which is fixed to the roof panel 3, is located between the roof panel 3 and the roof headlining 4. The rear end of the roof panel 3 (the right end as viewed in FIG. 4) is bent so as to approach the inner panel 20 and coupled to the rear end of the inner panel 20. The rear end of the roof panel 3 functions as a rear roof rail 23 for supporting a rear door 21. The rear door 21 is pivotally attached to the rear end of the roof panel 3, that is, to the rear roof rail 23 by means of a hinge mechanism 22. The rear door 21 has the rear window 11.

The roof headlining 4 is attached to the roof panel 3 so as to be pivotable downward about a part that is in front of a section of the inner panel 20 attached to the roof panel 3 (left end as viewed in FIG. 4), for example, about the front end of the roof headlining 4. The rear end of the roof headlining 4 is engaged with an engagement piece 24 provided at the rear end of the rear roof rail 23 (alternatively, at the rear end of the roof panel 3 or the inner panel 20). The engagement between the rear end of the roof headlining 4 and the engagement piece 24 is cancelled when the roof headlining 4 is pushed substantially downward.

The folded airbag 5 and the inflator 6 are accommodated in a space below the inner panel 20 and between the roof panel 3 and the roof headlining 4. The airbag 5 is rearward of the inflator 6. The inner panel 20 is formed to have a high rigidity so as to be hardly deformed when an impact is applied to the automobile 2 from behind, and the airbag 5 and the inflator 6 are attached to the inner panel 20. The airbag 5 is attached to the inner panel 20 in the following manner. First, the first attachment portion 16 and the second attachment portions 27 of the airbag 5 are placed on the inner panel 20 from below. Then the first attachment portion 16 is fixed with a bolt 25 and a nut 26 (see FIG. 4), and the second attachment portions 27 are fixed with bolts 30 (see FIG. 5A).

As described above, the airbag 5 is folded such that the first portion (the lower portion as viewed in FIG. 3) approaches the second portion (the upper portion as viewed in FIG. 3). More specifically, the first portion is accordion-folded, and the second portion is rolled, so that an elongated folded intermediate is formed. Thereafter, each end of the folded intermediate is accordion-folded at an even number (for example, two) of folding lines. The folding of the airbag 5 is thus complete. The thus folded airbag 5 is arranged over the roof headlining 4 such that folded-back portions 38 of the airbag 5, which are formed by accordion-folding the ends of the folded intermediate, are downward of the remainder of the airbag 5. The folded airbag 5 is bound by means of binding tape (not shown) at positions including the folded-back portions 38. Due to the difference in the ways of folding, gas supplied from the inflator 6 is more likely to flow into the first portion of the airbag 5, which is accordion folded, compared to the second portion of the airbag 5 in the rolled state. On the other hand, the rolled second section of the airbag 5 is unfolded by rolling on the inclined roof headlining 4 when the roof headlining 4 pivots downward.

As shown in FIG. 5A, the roof headlining 4 is located above upper ends 32a of a pair of rear pillar garnishes 32 located at the side ends of the automobile 2 in the rear portion of the automobile 2. Each of left and right ends 4a of the roof headlining 4 is located outside of the upper end 32a of the corresponding rear pillar garnish 32 with respect to the direction of the width of the automobile 2. Since the airbag 5 has a shape that corresponds to the space in the rear portion of the passenger compartment 19, the length of the folded intermediate is greater than the space between the upper ends 32a of the rear pillar garnishes 32. Therefore, the folded intermediate cannot be accommodated on the roof headlining 4 as-is. However, since the ends of the folded intermediate are folded back, the folded airbag 5 has a width less than the space between the upper ends 32a of the rear pillar garnishes 32, and can be easily accommodated on the roof headlining 4.

The second attachment portions 27 are located at the ends of the folded airbag 5. When attaching the airbag 5 to the inner panel 20 by means of the second attachment portions 27, the coupling portion 28 of each second attachment portion 27 is expanded outward in the width direction of the automobile 2. As a result, the folded airbag 5, which is attached to the inner panel 20, contacts the lower surface of the inner panel 20. Further, the space between two parts of the inner panel 20 to which the fixation portions 29 of the second attachment portions 27 are attached is slightly greater than the space between the fixation portions 29 of the airbag 5 before being attached to the inner panel 20. Therefore, the folded airbag 5, which is attached to the inner panel 20, receives an outward tension along a direction perpendicular to the deployment direction of the airbag 5, that is, an outward tension along the first direction. As a result, the ends of the folded airbag 5 are prevented from hanging down.

In the state where the airbag 5 is attached to the inner panel 20, the direction in which the coupling portion 28 of each second attachment portion 27 extends is, as shown in FIG. 5B, coincides with the direction in which the folded airbag 5 extends, that is, with the first direction, and is perpendicular to the deployment direction of the airbag 5 (from top to bottom in FIG. 5B), or to the second direction. The distal end of each coupling portion 28 is joined to the fixation portion 29 over the entire width of the coupling portion 28 (or the entire vertical dimension of the coupling portion 28 as viewed in FIG. 5B). The proximal end of each coupling portion 28 is joined to one of the ends of the folded airbag 5 over a width that is greater than or equal to half the width of the folded airbag 5 (or over a width that is greater than or equal to half the vertical dimension of the folded airbag S as viewed in FIG. 5B).

The folded airbag 5, which is accommodated in the ceiling of the automobile 2 in the above described manner, is deployed and inflated as described below.

When gas is supplied from the inflator 6 to the airbag 5 through the inlet 12a, the tape binding the airbag 5 is broken. Then, mostly due to the inflation of the folded-back portions 38 of the airbag 5, a substantially downward pressing force is applied to the roof headlining 4. This causes each of the left and right ends 4a of the roof headlining 4 to extend beyond the upper end 32a of the corresponding rear pillar garnishes 32, and is located downward of the upper end 32a. In this manner, the roof headlining 4 is pivoted downward about the front end of the roof headlining 4. As a result, the rolled portion of the airbag 5 is inflated while being deployed to exit rearward from the space between the roof panel 3 and the roof headlining 4.

When the airbag 5 is deployed and inflated in this manner, the momentum of the gas supplied from the inflator 6 through the inlet 12a applies to the airbag 5 a force acting rearward (rightward as viewed I FIG. 6) of the automobile 2. However, the airbag 5 is prevented from being displaced rearward by the attachment of the airbag 5 to the inner panel 20 by means of the first attachment portion 16. At the initial stage of the deployment and inflation of the airbag 5, the airbag 5 receives a force represented by arrow Y1 in FIG. 6, which acts to pivot the airbag 5 forward (leftward as viewed in FIG. 6) about the first attachment portion 16, due to the own inflation. However, the airbag 5 is prevented from being pivoted by the attachment of the airbag 5 to the inner panel 20 by means of the second attachment portions 27.

As described above, the folded airbag 5, which is attached to the inner panel 20, receives an outward tension the direction of which is perpendicular to the deployment direction of the airbag 5. This prevents the ends of the folded airbag 5 from hanging down. Further, the airbag 5 is prevented from being pivoted by an urging force that acts on the airbag 5 in the initial stage of the deployment and inflation of the airbag 5 to pivot the airbag 5 about the first attachment portion 16. That is, the primary factors that hinder favorable deployment and inflation of the airbag 5 in the case where the airbag 5 is accommodated in the ceiling of the automobile 2 are all eliminated. Thus, the airbag 5 is inflated while being deployed along a previously assumed path shown, for example, by broken lines in FIG. 6, and is prevented from being inflated while being deployed along an unexpected path shown, for example, by two-dot chain line in FIG. 6.

The above described embodiment has the following advantages.

(1) When attaching the folded airbag 5 to the inner panel 20 by means of the second attachment portions 27, the coupling portion 28 of each second attachment portion 27 is expanded outward in the width direction of the automobile 2. As a result, the folded airbag 5, which is attached to the inner panel 20, receives an outward tension the direction of which is perpendicular to the deployment direction of the airbag 5.

This prevents the ends of the folded airbag 5 from hanging down. Further, an urging force that acts on the airbag 5 attached to the inner panel 20 in the initial stage of the deployment and inflation of the airbag 5 to pivot the airbag 5 about the first attachment portion 16 is prevented by the structure in which the airbag 5 is attached to the inner panel 20 at the first attachment portion 16. Thus, reliable deployment and inflation of the airbag 5 is not hindered by hanging down of the ends of the folded airbag 5 and pivoting motion of the airbag 5 about the first attachment portion 16 in the initial stage of the deployment and inflation.

(2) The coupling portion 28 of each second attachment portion 27 extends perpendicularly to the deployment direction of the airbag 5. That is, the tension applied to the airbag 5 by the coupling portions 28 is perpendicular to the deployment direction of the airbag 5. This further improves the deployment and inflation of the airbag 5.

(3) The distal end of each coupling portion 28 is joined to the fixation portion 29 over the entire width of the coupling portion 28. The proximal end of each coupling portion 28 is joined to one of the ends of the folded airbag 5 over a width that is greater than or equal to half the width of the folded airbag 5. Thus, the airbag 5 does not easily separate from the inner panel 20, and the ends of the folded airbag 5 are reliably prevented from hanging down.

(4) Major part of the gas supplied from the inflator 6 through the inlet 12a is guided to the ends of the folded airbag 5 by the inner tube 18. Therefore, the inflation at the ends of the folded airbag 5 progresses quickly, which tends to pivot the ends about the first attachment portion 16. However, since the second attachment portions 27 are provided at the ends of the folded airbag 5, the second attachment portions 27 reliably prevent the ends from being pivoted about the first attachment portion 16.

The above embodiment may be modified as follows.

Figure 7:
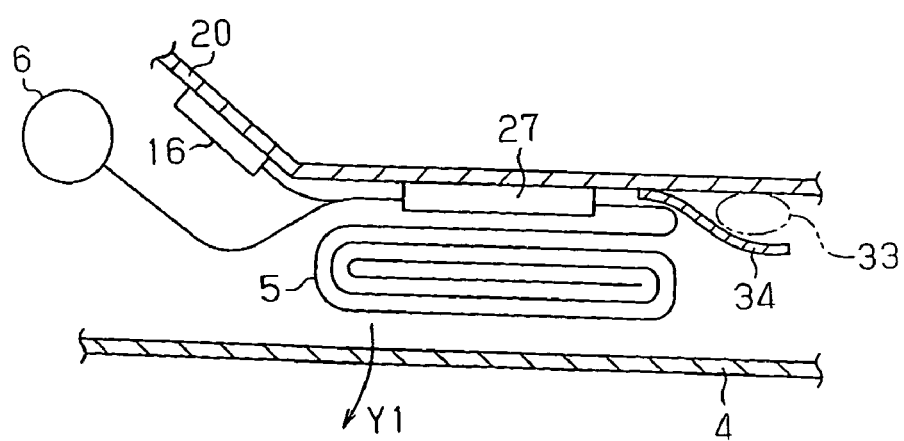
FIG. 7 is a diagram for explaining another embodiment of the present invention in which a guide member is arranged behind a folded airbag.

There are cases where a wiring harness 33 passes through a space rearward (leading side in the deployment direction) of an airbag 5 accommodated in the ceiling of an automobile 2 as shown in FIG. 7. In this case, the airbag 5 may interfere with the wiring harness 33 during deployment and inflation, hindering the favorable deployment and inflation of the airbag 5. To deal with this problem, a guide member 34 may be provided that guides the airbag 5 during deployment and inflation so as to prevent the airbag 5 from interfering with the wiring harness 33. The guide member 34 may be attached to either of the inner panel 20 or the airbag 5.

Figure 8:
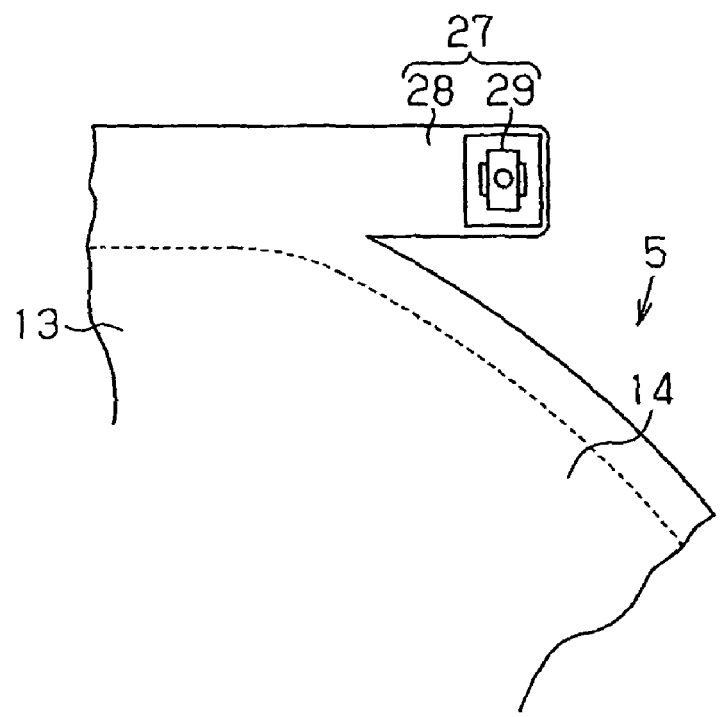
FIG. 8 is a front view partially showing an unfolded airbag of an airbag apparatus according to another embodiment of the present invention in which second attachment portions are different from those in the foregoing embodiments.
Figure 9:
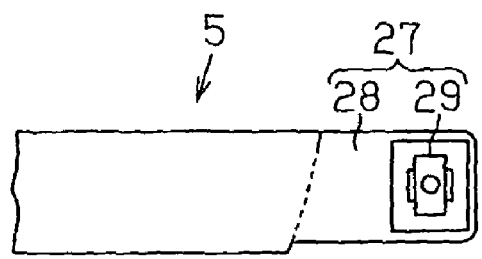
FIG. 9 is a plan view partially showing a folded state of the airbag shown in FIG. 8.

As shown in FIG. 8, the coupling portion 28 of each second attachment portions 27 may be formed by a part of the fabric sheets that forms the airbag 5. In this case, also, the coupling portions 28 are located at the ends of the folded airbag 5 as shown in FIG. 9. This structure eliminates the process for attaching the second attachment portions 27 to the airbag 5.

Figure 10:
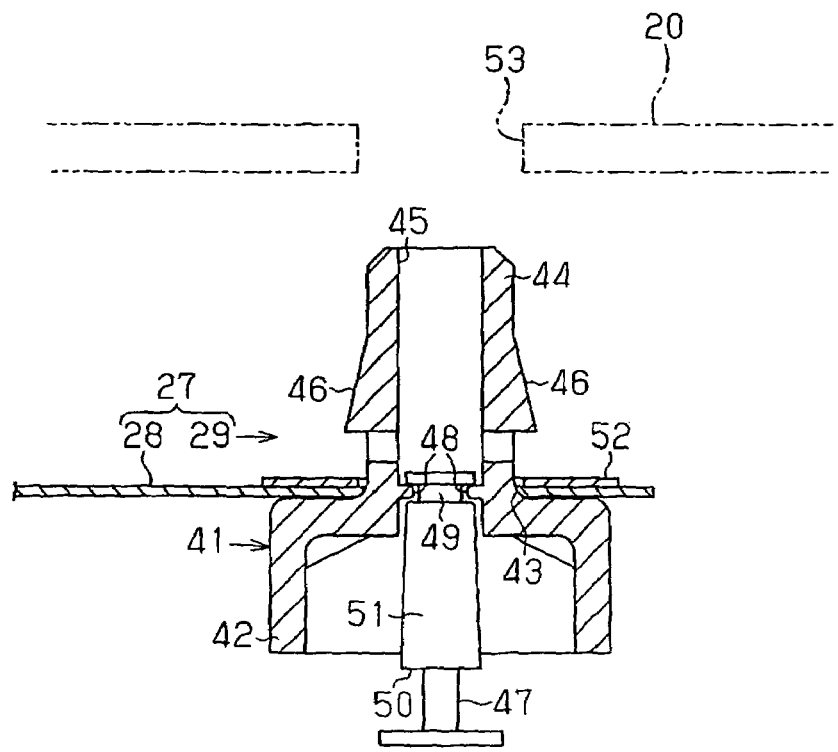
FIGS. 10 and 11 are cross-sectional views of a fixation portion of an airbag apparatus according to another embodiment of the present invention in which second attachment portions are different from those in the foregoing embodiments.
Figure 11:
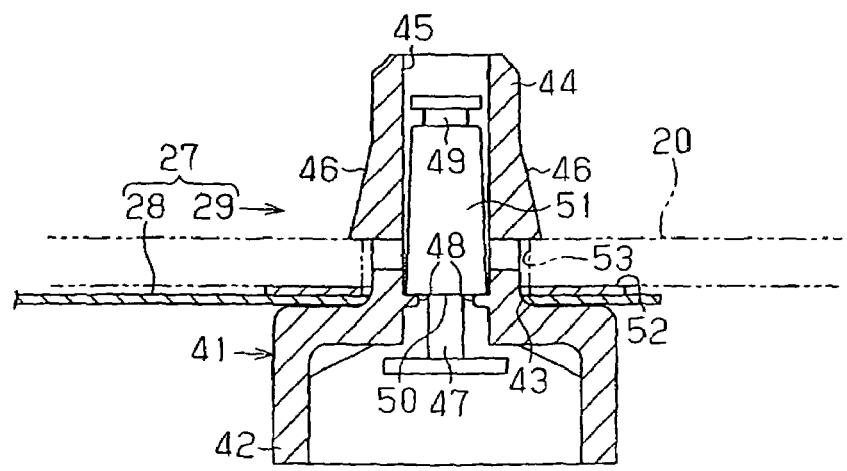

The fixation portion 29 of each second attachment portions 27 may be constructed as shown in FIG. 10. The fixation portion 29 shown in FIG. 10 has a bushing 41. The bushing 41 has a base portion 42 and a projection 44 projecting from the base portion 42. The bushing 41 is attached to the distal end of the coupling portion 28 by passing the projection 44 through a hole 43 formed in the coupling portion 28, such that the base portion 42 contacts a surface of the coupling portion 28 opposite to a surface of the coupling portion 28 that faces the inner panel 20. The projection 44 has an axial hole 45 that extends along the direction in which the projection 44 extends. A pair of hooks 46 are formed opposite wall surfaces of the projection 44. The hooks 46 are elastic so as to approach and separate from each other. A pin 47 is inserted into the axial hole 45 of the projection 44. An engagement groove 49 is formed in a distal end (the upper end as viewed in FIG. 10) of the pin 47, and an engagement step 50 is formed in a proximal end (the lower end as viewed in FIG. 10) of the pin 47. The engagement groove 49 and the engagement step 50 are engageable with an engagement portion 48 formed on the inner circumferential surface of the axial hole 45. A section 51 of the pin 47 between the engagement groove 49 and the engagement step 50 has a diameter that increases toward the proximal end. A support plate 52 is fitted about the projection 44. The coupling portion 28 is held between the support plate 52 and the base portion 42. The hooks 46 of the projection 44 prevent the support plate 52 from separating from the projection 44.

When attaching the airbag 5 to the inner panel 20 using the second attachment portion 27 with the fixation portion 29 shown in FIG. 10, the projection 44 is inserted to a hole 53 formed in the inner panel 20 until the hooks 46 of the projection 44 pass the hole 53. This temporarily fix the fixation portion 29 to the inner panel 20. Thereafter, the pin 47 is pressed toward the distal end of the projection 44 with the engagement groove 49 engaged with the engagement portion 48 of the axial hole 45. Accordingly, the engagement groove 49 of the pin 47 is disengaged from the engagement portion 48 in the axial hole 45, and the engagement step 50 of the pin 47 is engaged with the engagement portion 48. At this time, the section 51 of the pin 47 is located between the hooks 46, and prevents the hooks 46 from being deformed to approach each other. Thus, the projection 44 cannot come off the hole 53 of the inner panel 20, so that the fixation portion 29 is fixed to the inner panel 20. By fixing the fixation portion 29 to the inner panel 20 in this manner, the airbag 5 is attached to the inner panel 20. Therefore, when the fixation portion 29 of each second attachment portion 27 has the structure shown in FIG. 10, the process for attaching the airbag 5 to the inner panel 20 is facilitated.

Instead of or in addition to providing the fixation portion 29 shown in FIG. 10 in each second attachment portions 27, the first attachment portion 16 may have a fixation portion 29 shown in FIG. 10.

An end of the coupling portion 28 that is attached to the airbag 5, that is, the proximal end of the coupling portion 28, may be joined to one of the ends of the folded airbag 5 over a width less than half the width of the folded airbag 5. With respect to the width of the folded airbag 5, the proximal end of the coupling portion 28 may be attached to a part in a half of the folded airbag 5 located further from the inlet 12a or to a part in a half of the folded airbag 5 located closer to the inlet 12a. However, the proximal end of the coupling portion 28 is preferably attached to the part further from the inlet 12a. In the case where the proximal end of the coupling portion 28 is joined to the airbag 5 at a width less than half the width of the folded airbag 5, the coupling portion 28 may be formed by a cord.

The coupling portion 28 of each second attachment portion 27 does not need to extend perpendicularly to the deployment direction of the airbag 5, but may intersect the deployment direction of the airbag 5 at an angle other than 90°.

The folded airbag 5, which is attached to the inner panel 20, does not need to receive an outward tension along a direction perpendicular to the deployment direction of the airbag 5. For example, the space between two parts of the inner panel 20 to which the fixation portions 29 of the second attachment portions 27 are attached may be equal to the space between the fixation portions 29 of the airbag 5 before being attached to the inner panel 20. In this case, also, the ends of the folded airbag 5 are prevented from hanging down. Even if no outward tension in a direction perpendicular to the deployment direction of the airbag 5 is applied to the folded airbag 5 in advance, the length of the airbag 5 in the direction of the width of the automobile 2 is slightly reduced when the airbag 5 is inflated. As a result, during the deployment and inflation of the airbag 5, an outward tension along a direction perpendicular to the deployment direction of the airbag 5 is applied to the airbag 5. In this case, also, the airbag 5 is prevented from pivoting about the first attachment portion 16 in the initial stage of the deployment and inflation.

The first attachment portion 16 may be omitted. In this case also, since the connection portion 12 of the airbag 5 is attached to the inflator 6 attached to the inner panel 20, the airbag 5 is attached to the inner panel 20 not only at the second attachment portions 27, but also at other portions.

In addition to the first attachment portion 16 and the second attachment portions 27, a third attachment portion for attaching the airbag 5 to the inner panel 20 may be provided at a portion of the folded airbag 5 that is located in a leading side in the deployment direction of the airbag 5. The third attachment portion may have a structure as shown in FIGS. 12 to 15.

Figure 12:
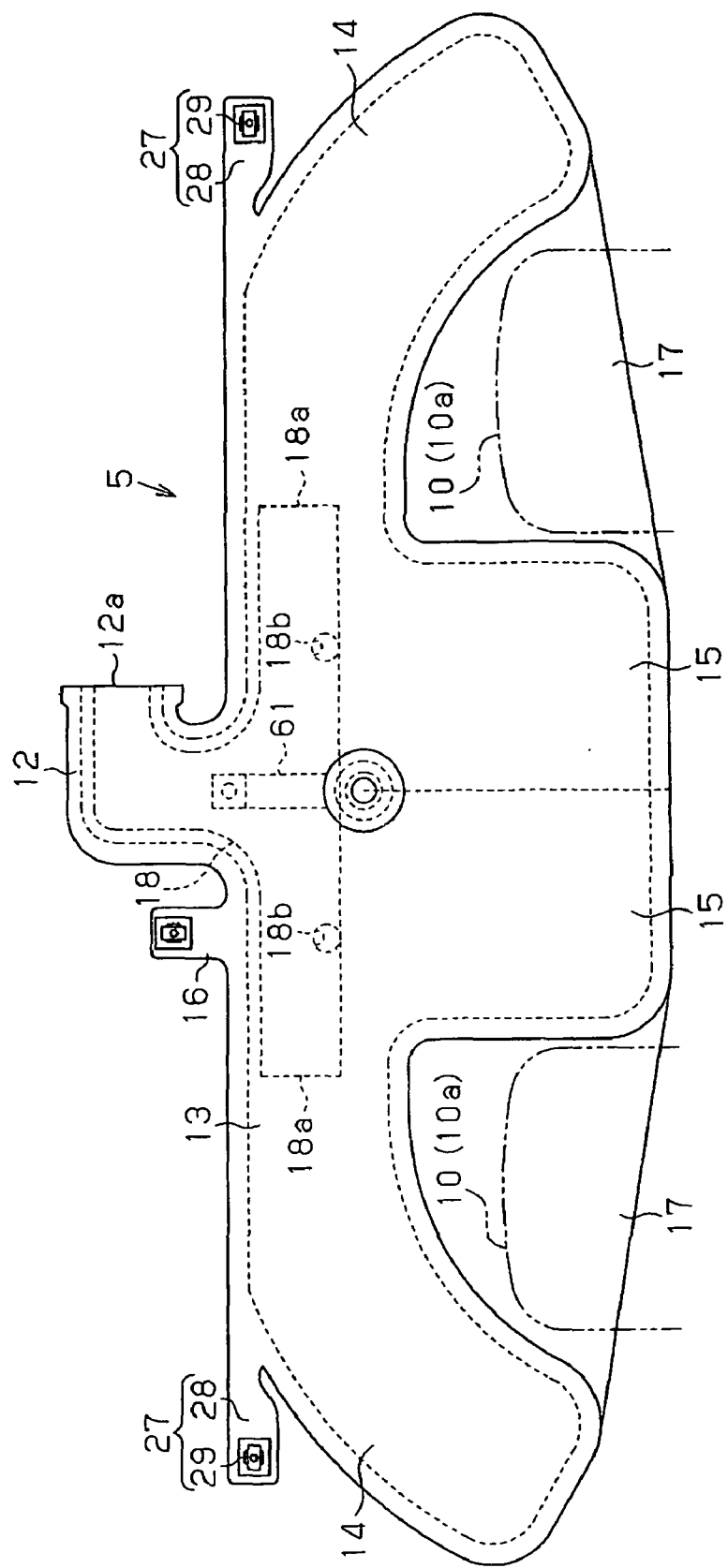
FIG. 12 is a front view showing an unfolded state of an airbag of an airbag apparatus according to another embodiment.
Figure 13:
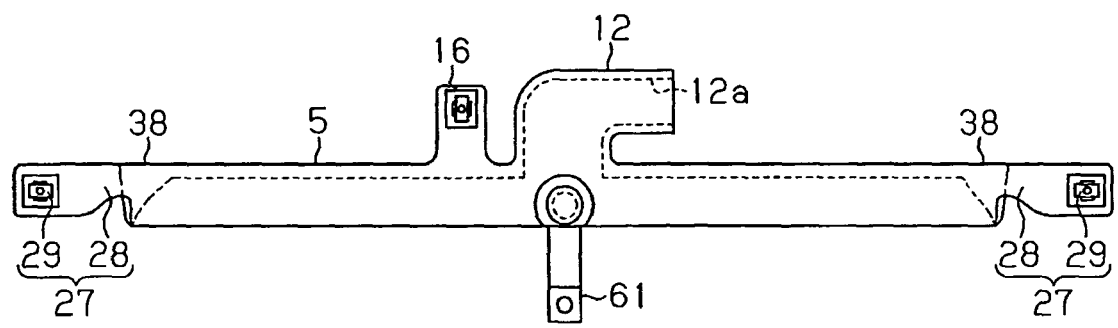
FIG. 13 is a plan view showing a folded state of the airbag shown in FIG. 12.
Figure 14:
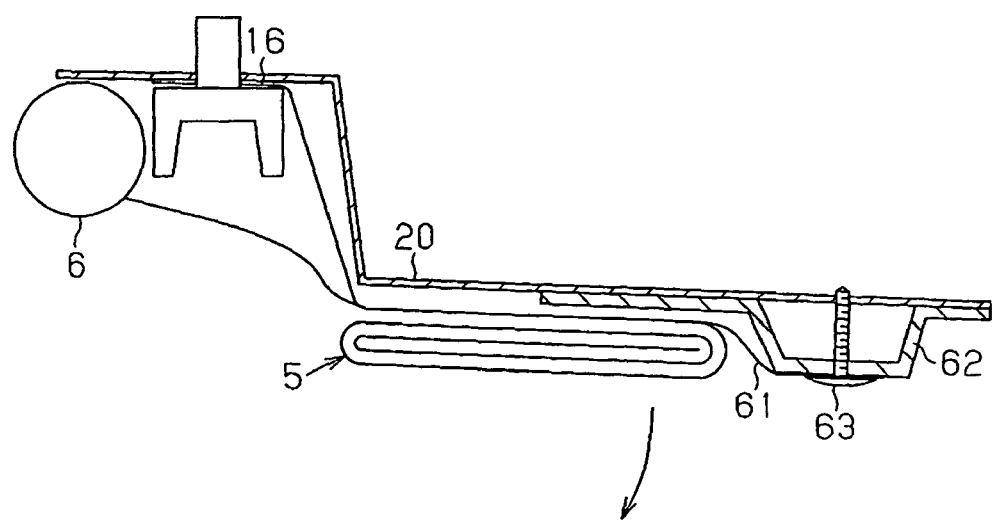
FIGS. 14 and 15 are a cross-sectional side view and a cross-sectional front view each showing a state in which the airbag shown in FIG. 12 is accommodated in a vehicle ceiling.

A third attachment portion 61 shown in FIGS. 12 to 15 extends along the deployment direction of the airbag 5 from the center of the airbag 5 with respect to a direction perpendicular to the deployment direction as shown in FIGS. 12 and 13. As shown in FIG. 14, the third attachment portion 61 is applied from below to a bracket 62 fixed to the inner panel 20, and then attached to the bracket 62 with a bolt 63. The third attachment portion 61 may have a fixation portion 29 as shown in FIG. 10. Each of the first attachment portion 16 and the second attachment portions 27 shown in FIGS. 12 to 15 each may have a fixation portion 29 shown in FIG. 10.

Figure 15:
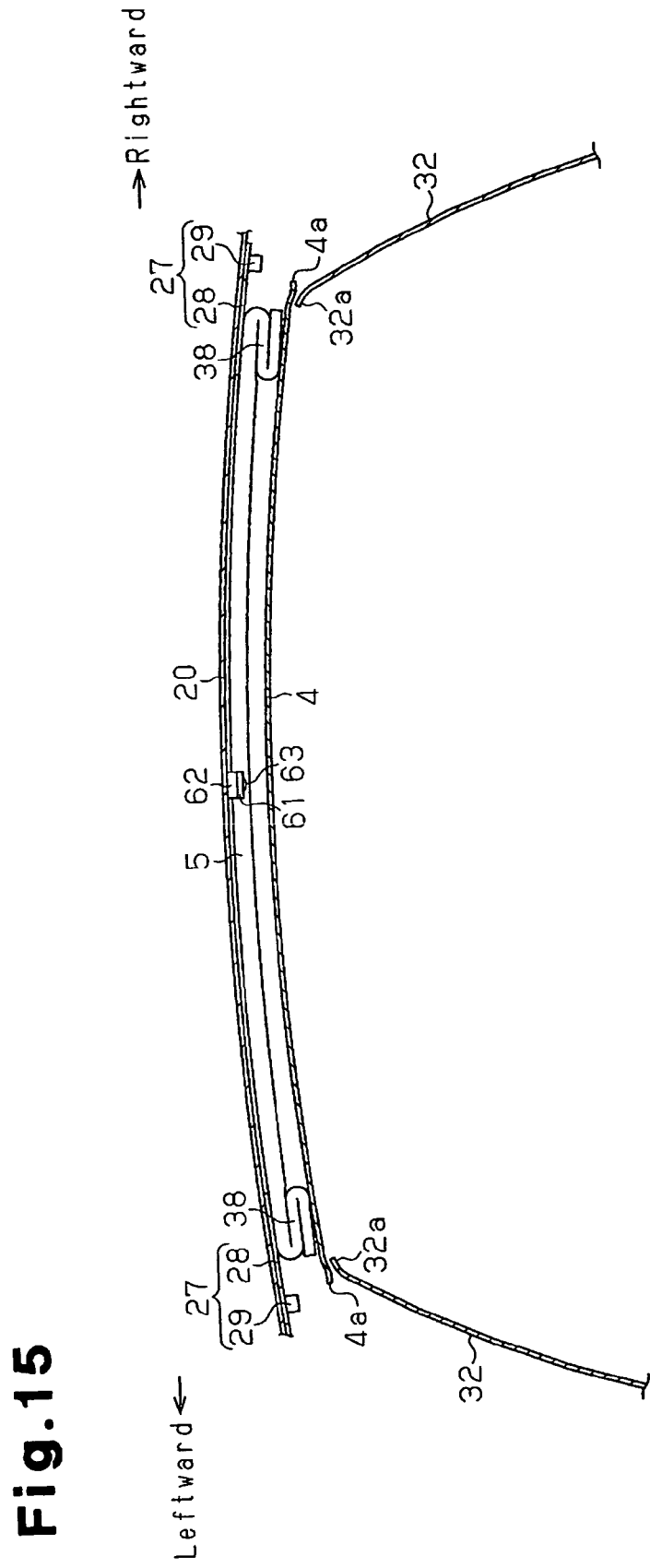

The self weight of the airbag 5 applies to the airbag 5 an urging force that acts to pivot the airbag 5 forward (leftward as viewed in FIG. 14) about the first attachment portion 16, resulting in a pivoting motion of the airbag 5 indicated by an arrow in FIG. 14. Such pivoting motion is reliably prevented by the third attachment portion 61. Also, instead of being flat as shown in FIG. 5, the inner panel 20, to which the airbag 5 is attached, is, for example curved with respect to the direction of the width of the automobile 2 as shown in FIG. 15 in some cases. If the airbag 5 is attached to the curved inner panel 20 by means of only the first attachment portion 16 and the second attachment portions 27, a gap can exist between the inner panel 20 and the airbag 5. Such a gap is prevented from being created by attaching the airbag 5 to the curved inner panel 20 by means not only of the first attachment portion 16 and the second attachment portions 27, but also of the third attachment portion 61.

The number of third attachment portions, which are located in a portion of the folded airbag 5 located at the leading side in the deployment direction of the airbag 5 may be one or more. In the case where one third attachment portion is provided, the third attachment portion is preferably located at the center of the airbag 5 in a direction perpendicular to the deployment direction of the airbag 5 as shown in FIG. 13. In the case where two or more third attachment portions are provided, the third attachment portions are preferably arranged symmetrically with respect to the center of the airbag 5 in a direction perpendicular to the deployment direction of the airbag 5. The third attachment portions are also preferably located at positions closer to the center of the airbag 5 in the direction perpendicular to the deployment direction of the airbag 5.

The number of the first attachment portion 16 is not limited to one, but two ore more first attachment portions 16 may be provided. When a plurality of first attachment portions 16 are provided, the first attachment portions 16 are preferably arranged at predetermined intervals, for example, equal intervals, along the direction perpendicular to the deployment direction of the airbag 5.

In the illustrated embodiments, the present invention is applied to the airbag apparatus, in which the airbag 5 accommodated in the ceiling of the automobile 2 is inflated while being deployed downward and toward the rear of the vehicle. However, the present invention may be applied to an airbag apparatus in which an airbag accommodated in the ceiling of a vehicle is inflated while being deployed outward in the direction of the width of the vehicle. In this case, the folded airbag is accommodated in the vehicle ceiling in a state of extending in the front-rear direction of the vehicle.

The invention claimed is:

1. An airbag apparatus comprising an airbag, wherein:
the airbag includes a first portion and a second portion,
the airbag is folded prior to being deployed by folding the airbag such that the first portion approaches the second portion, and the folded airbag has an elongated shape extending along a first direction,
the airbag has an inlet, wherein, when receiving supply of gas through the inlet, the folded airbag is inflated while being deployed in a second direction, which is perpendicular to the first direction, such that the first portion moves away from the second portion,
in the folded airbag, the inlet is arranged in a trailing position in the second direction,
a first attachment portion is provided in the trailing position of the folded airbag,
a second attachment portion is provided in each of the ends of the folded airbag,
the folded airbag is installed between a roof panel and a roof headlining in a ceiling of a vehicle from below by the first attachment portion and the second attachment portions,
the second attachment portions are fixed to the ceiling, and
when the airbag is being deployed and inflated, the second attachment portions function to apply an outward tension along the first direction to the airbag, wherein
the second attachment portions each include a coupling portion extending from one of the ends of the folded airbag, and a fixation portion that is provided at a distal end of the coupling portion and is fixed to the vehicle ceiling, and
each second attachment portion extends outward along the first direction.

2. The airbag apparatus according to claim 1, wherein the folded airbag is installed in the vehicle ceiling in a state where the outward tension along the first direction is applied to the airbag by the second attachment portions.

3. The airbag apparatus according to claim 1, wherein an inner tube is provided in a portion of the airbag that is close to the inlet, the inner tube conducting the gas, which is supplied into the airbag through the inlet, outward along the first direction.

4. The airbag apparatus according to claim 1, wherein a third attachment portion is provided at a part of the folded airbag, which part is located on a leading side in the second direction, and wherein the folded airbag is installed in the vehicle ceiling by not only the first attachment portion and the second attachment portions but also the third attachment portion.

5. An airbag apparatus comprising an airbag, wherein:
the airbag includes a first portion and a second portion,
the airbag is folded prior to being deployed by folding the airbag such that the first portion approaches the second portion, and the folded airbag has an elongated shape extending along a first direction,
the airbag has an inlet, wherein, when receiving supply of gas through the inlet, the folded airbag is inflated while being deployed in a second direction, which is perpendicular to the first direction, such that the first portion moves away from the second portion,
in the folded airbag, the inlet is arranged in a trailing position in the second direction,
a first attachment portion is provided in the trailing position of the folded airbag,
a second attachment portion is provided in each of the ends of the folded airbag,
the folded airbag is installed between a roof panel and a roof headlining in a ceiling of a vehicle from below by the first attachment portion and the second attachment portions,
the second attachment portions are fixed to the ceiling, and
when the airbag is being deployed and inflated, the second attachment portions function to apply an outward tension along the first direction to the airbag, wherein
the second attachment portions each include a coupling portion extending from one of the ends of the folded airbag, and a fixation portion that is provided at a distal end of the coupling portion and is fixed to the vehicle ceiling, and
each second attachment portion is joined to one of the ends of the folded airbag over a width that is greater than or equal to half the width of the folded airbag.

6. An airbag apparatus comprising an airbag, wherein:
the airbag includes a first portion and a second portion,
the airbag is folded prior to being deployed by folding the airbag such that the first portion approaches the second portion, and the folded airbag has an elongated shape extending along a first direction,
the airbag has an inlet, wherein, when receiving supply of gas through the inlet, the folded airbag is inflated while being deployed in a second direction, which is perpendicular to the first direction, such that the first portion moves away from the second portion,
in the folded airbag, the inlet is arranged in a trailing position in the second direction,
a first attachment portion is provided in the trailing position of the folded airbag,
a second attachment portion is provided in each of the ends of the folded airbag,
the folded airbag is installed between a roof panel and a roof headlining in a ceiling of a vehicle from below by the first attachment portion and the second attachment portions,
the second attachment portions are fixed to the ceiling, and
when the airbag is being deployed and inflated, the second attachment portions function to apply an outward tension along the first direction to the airbag, wherein a wiring harness passes through a section on a leading side of the folded airbag in the second direction, and wherein the apparatus further includes a guide member that guides the airbag being deployed and inflated such that the airbag does not interfere with the wiring harness.

* * * * *